US008285466B2

(12) United States Patent
Oriet

(10) Patent No.: US 8,285,466 B2
(45) Date of Patent: Oct. 9, 2012

(54) AIRBRAKE RESERVOIR LOCK SYSTEM

(75) Inventor: Leo P. Oriet, Rochester Hills, MI (US)

(73) Assignee: Navistar Canada, Inc. (CA)

( * ) Notice: Subject to any disclaimer, the term of this patent is extended or adjusted under 35 U.S.C. 154(b) by 660 days.

(21) Appl. No.: 12/503,107

(22) Filed: Jul. 15, 2009

(65) Prior Publication Data

US 2011/0015846 A1    Jan. 20, 2011

(51) Int. Cl.
    *B60T 13/18*    (2006.01)
(52) U.S. Cl. ............. 701/78; 701/83; 303/9.73; 303/59; 604/58
(58) Field of Classification Search ............ 701/78, 701/83; 303/133, 59, 71, 78, 9.73; 604/58; 340/450.1; *B60T 13/18*
    See application file for complete search history.

(56) References Cited

U.S. PATENT DOCUMENTS

| | | | |
|---|---|---|---|
| 3,744,602 A | 7/1973 | Ajwani | |
| 5,205,315 A | 4/1993 | Margerum | |
| 5,335,978 A | 8/1994 | LaBastide | |
| 5,533,795 A | 7/1996 | Brooks | |
| 5,577,814 A * | 11/1996 | Engelbert et al. | 303/118.1 |
| 5,614,778 A * | 3/1997 | Terao et al. | 310/80 |
| 5,621,657 A * | 4/1997 | Ferri | 702/47 |
| 5,695,258 A * | 12/1997 | Reid et al. | 303/3 |
| 5,963,883 A * | 10/1999 | Cunkelman et al. | 702/47 |
| 6,007,159 A | 12/1999 | Davis et al. | |
| 6,234,586 B1 | 5/2001 | Davis et al. | |
| 6,257,680 B1 * | 7/2001 | Jacob | 303/9.73 |
| 7,216,941 B2 | 5/2007 | Thomas | |
| 7,374,252 B2 * | 5/2008 | Schweikert et al. | 303/3 |
| 7,472,011 B2 * | 12/2008 | Fenske et al. | 701/70 |
| 7,529,610 B1 * | 5/2009 | Fenske et al. | 701/70 |
| 7,530,404 B2 * | 5/2009 | Lenz, Jr. | 169/24 |
| 7,577,509 B2 * | 8/2009 | Goebels et al. | 701/78 |
| 7,850,248 B2 * | 12/2010 | Jones | 298/22 R |
| 2002/0036428 A1 * | 3/2002 | Jacob | 303/9.73 |
| 2004/0146408 A1 * | 7/2004 | Anderson | 417/63 |
| 2006/0108860 A1 * | 5/2006 | Stragier | 303/15 |
| 2008/0067862 A1 * | 3/2008 | Parrott et al. | 303/7 |
| 2010/0295366 A1 * | 11/2010 | Bradley et al. | 303/133 |

OTHER PUBLICATIONS

Subramanian, S.C., Darhha, S., "Rajagopal, K.R.Diagnosing the air brake system of commercial vehicles", Publication Year: 2006.*
Subramanian, S.C., Darbha, S., Rajagopal, K.R, "Modeling the pneumatic subsystem of a s-cam air brake system", vol. 2, Publication Year: 2003 , pp. 1416-1421.*

* cited by examiner

*Primary Examiner* — Tuan C. To
(74) *Attorney, Agent, or Firm* — Jeffrey P. Calfa; Mark C. Bach

(57) ABSTRACT

An airbrake reservoir lock system for an airbrake system of a vehicle is provided. The vehicle has an electronic control module. The airbrake reservoir lock system comprises a primary air reservoir, and a first airbrake reservoir lock. The primary air reservoir has an input port and an output port. The primary air reservoir stores an amount of pressurized air. The first airbrake reservoir lock is disposed in fluid communication with the output port of the primary air reservoir. The first airbrake reservoir lock has a valve portion and an electrical actuator. The valve portion has an open position and a closed position. The electrical actuator positions the valve portion of the first airbrake reservoir lock between the open position and the closed position based upon an output of the electronic control module.

19 Claims, 7 Drawing Sheets

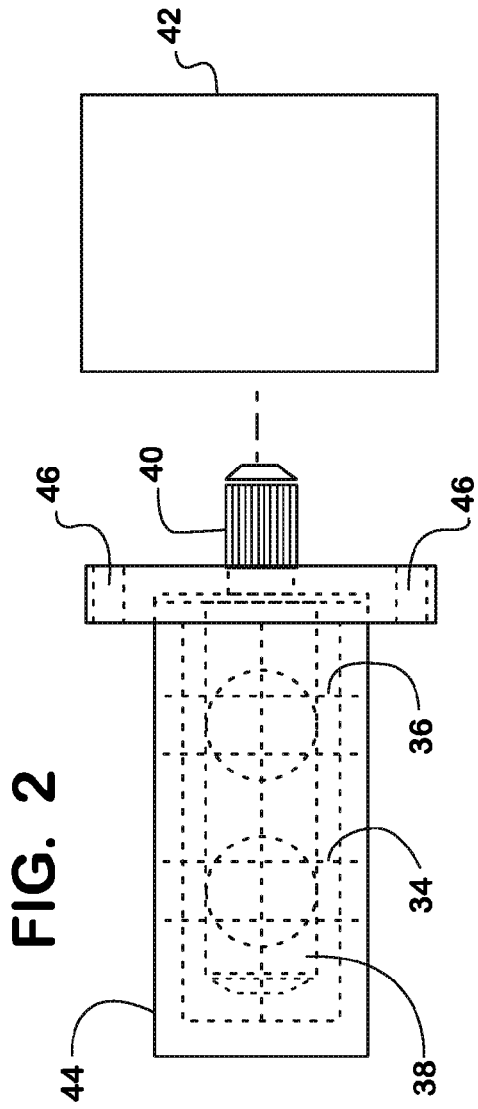
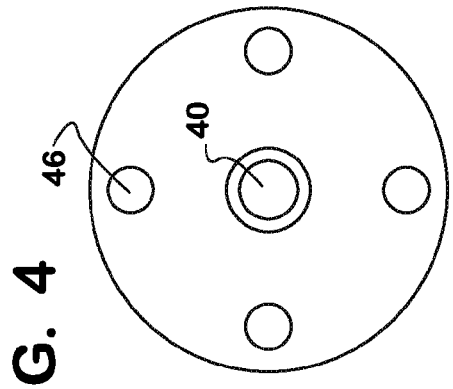
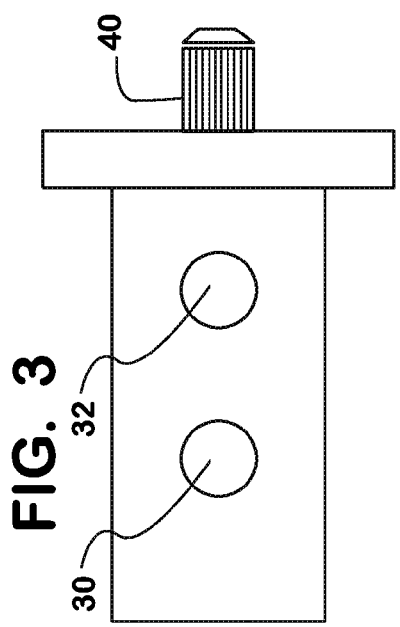

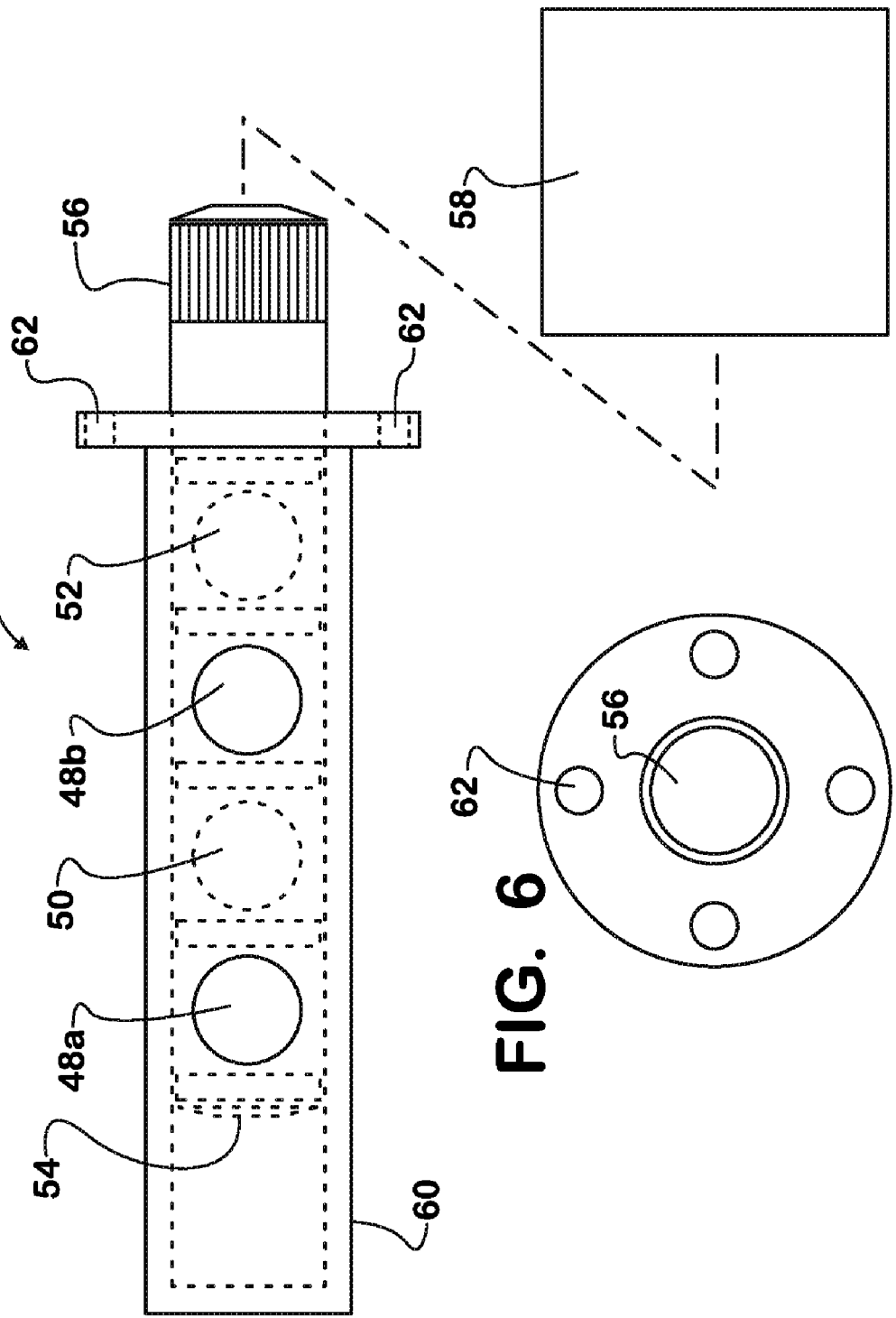

AIRBRAKE RESERVOIR LOCK SYSTEM

TECHNICAL FIELD

The present disclosure relates to an airbrake reservoir lock for use with an airbrake system, such as for a vehicle, and more particularly to an airbrake reservoir lock that reduces an amount of air that leaks from a reservoir in an airbrake system.

BACKGROUND

Many vehicles utilize an airbrake system to stop the vehicle. An airbrake system typically has at least one air reservoir designed to contain pressurized air used in the airbrake system. The pressurized air in the air reservoir can leak out of the air reservoir when the vehicle is not operating, requiring that pressurized air be replenished in the air reservoir. Until a sufficient quantity and pressure of pressurized air has been replenished in the air reservoir, the airbrake system will not allow the vehicle to move. Therefore, it is often necessary for a vehicle with an airbrake system to idle for several minutes before the vehicle can move while air within the air reservoir is replenished. In many instances, the vehicle has been restarted after a long period of being off. Accordingly, the vehicle may produce undesirable smoke or noise levels when idling. Some vehicle operators must therefore park the vehicle outside, or a distance from their home or business so as not to fill a garage with pollutants, or produce disruptive noise.

Therefore, a need exists for an airbrake reservoir lock that reduces an amount of air that leaks from a reservoir in an airbrake system.

SUMMARY

According to one embodiment, an airbrake reservoir lock system for an airbrake system of a vehicle is provided. The vehicle has an electronic control module. The airbrake reservoir lock system comprises a primary air reservoir, and a first airbrake reservoir lock. The primary air reservoir has an input port and an output port. The primary air reservoir stores pressurized air. The first airbrake reservoir lock is disposed in fluid communication with the output port of the primary air reservoir. The first airbrake reservoir lock has a valve portion and an electrical actuator. The electrical actuator is disposed in electrical communication with the electronic control module. The valve portion has an open position and a closed position. The electrical actuator moves the valve portion of the first airbrake reservoir lock between the open position and the closed position in response to an output signal of the electronic control module.

A method of limiting air flow from an airbrake reservoir of a vehicle having an airbrake system, and an electronic control module is provided. The airbrake system has at least an airbrake reservoir and at least one airbrake reservoir lock. An airbrake reservoir lock is provided in fluid communication with an airbrake reservoir. A first output signal of the electronic control module actuates the airbrake reservoir lock to a locked position in response to the first output signal. A second output signal of the electronic control module actuates the airbrake reservoir lock to an unlocked position in response to the second output signal. The airbrake reservoir lock restricts air flow through the airbrake reservoir lock when the airbrake reservoir lock is in a locked position. The airbrake reservoir lock allows air flow through the airbrake reservoir lock when the airbrake reservoir lock is in an unlocked position.

According to another embodiment, an airbrake reservoir lock system for an airbrake system of a vehicle having an electronic control module is provided. The airbrake reservoir lock system comprises an air reservoir, a first airbrake reservoir lock, and a second airbrake reservoir lock. The air reservoir has a primary portion, a secondary portion and an input port. The primary portion has a primary portion output port. The secondary portion has a secondary portion output port. The air reservoir stores pressurized air. The first airbrake reservoir lock is disposed in fluid communication with the output port of the primary portion of the air reservoir. The first airbrake reservoir lock has a valve portion and an electrical actuator. The electrical actuator is disposed in electrical communication with the electronic control module. The valve portion has an open position and a closed position. The second airbrake reservoir lock is disposed in fluid communication with the output port of the secondary portion of the air reservoir. The second airbrake reservoir lock has a second valve portion and a second electrical actuator. The second electrical actuator is disposed in electrical communication with the electronic control module. The second valve portion has an open position and a closed position. The electrical actuator moves the valve portion of the first airbrake reservoir lock between the open position and a closed position in response to an output signal of the electronic control module. The second electrical actuator moves the second valve portion of the second airbrake reservoir lock between the open position and a closed position in response to an output signal of the electronic control module.

BRIEF DESCRIPTION OF THE DRAWINGS

To understand the present application, it will now be described by way of example, with reference to the accompanying drawings in which:

FIG. 2 is a top view of an airbrake reservoir lock according to one embodiment;

FIG. 3 is a side view of the valve of FIG. 2;

FIG. 4 is an end view of the valve of FIG. 2;

FIG. 5 is a side view of a valve for an airbrake reservoir lock according to another embodiment;

FIG. 6 is an end view of the valve of FIG. 5;

DETAILED DESCRIPTION

Figure 1:
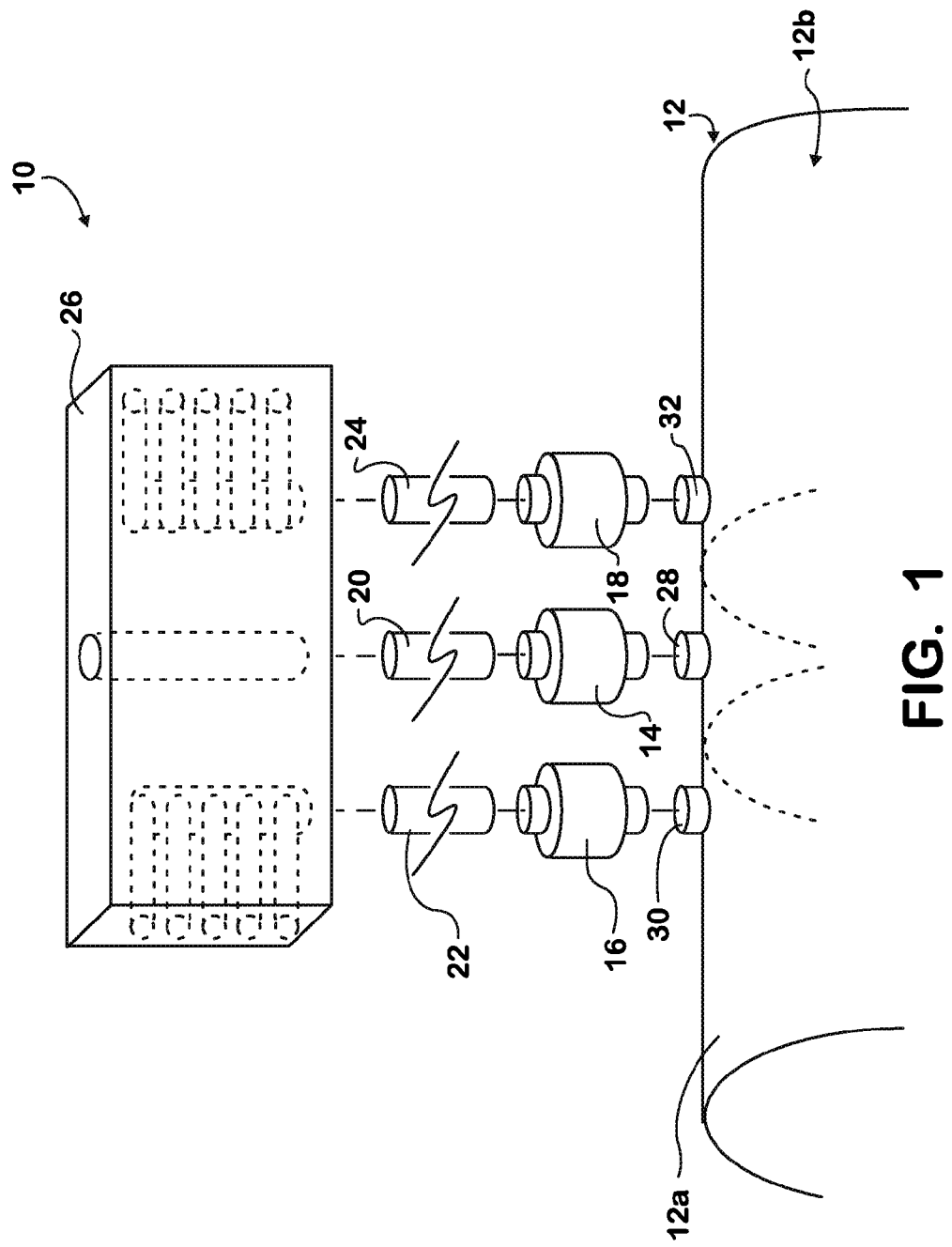
FIG. 1 is a schematic view of a portion of an airbrake system having an airbrake reservoir lock.

FIG. 1 schematically illustrates a portion of an airbrake system 10 for a vehicle that has an electronic control module. The airbrake system comprises an air reservoir 12, a plurality of airbrake reservoir locks 14, 16, 18, a plurality of hoses 20, 22, 24, and an air distribution block 26.

The air reservoir 12 is adapted to store pressurized air for the airbrake system 10. Air may be pressurized by an air compressor (not shown) that is a part of the airbrake system 10, and delivered to the air reservoir 12. The air reservoir 12 allows pressurized air to be stored so that the airbrake system 10 may deliver air to a plurality of brakes on a plurality of wheels of the vehicle to release the plurality of brakes.

The air reservoir 12 is an integrated air reservoir such that a primary reservoir portion 12a and a secondary reservoir portion 12b are contained within the air reservoir 12. Valves may be present within the reservoir 12 to prevent air from the primary reservoir portion 12a from mixing with air in the secondary reservoir portion 12b. It is additionally contemplated that separate air reservoirs may be provided for the primary reservoir and the secondary reservoir.

The air reservoir 12 has an input port 28 and a first output port 30 and a second output port 32. Air received in the input port 28 of the air reservoir 12 from the air compressor may be dried by an air dryer prior to entering the air reservoir 12 to remove moisture from the air. The air received via the input port 28 may be divided such that a portion of the air is delivered to the primary reservoir portion 12a, and another portion of the air is delivered to the secondary reservoir portion 12b. As shown in FIG. 1, the input port 28 of the air reservoir 12 is disposed in fluid communication with a first airbrake reservoir lock 14. The first airbrake reservoir lock 14 is additionally disposed in fluid communication with a first hose 20 adapted to route pressurized air to the first airbrake reservoir lock. The first airbrake reservoir lock 14 is adapted to limit air from flowing from the air reservoir 12 when the first airbrake reservoir lock 14 is in a locked position. The first airbrake reservoir lock 14 is additionally adapted to allow air to flow into the air reservoir 12 when the first airbrake reservoir lock 14 is in an unlocked position. The first airbrake reservoir lock 14, second airbrake reservoir lock 16, and third airbrake reservoir lock 18 may be generally identical, and will be described in greater detail below.

The first output port 30 of the air reservoir 12 is disposed in fluid communication with a second airbrake reservoir lock 16. The first output port 30 is disposed in fluid communication with the primary reservoir portion 12a. The second airbrake reservoir lock 16 is disposed in fluid communication with the distribution block 26 via a second hose 22. The second airbrake reservoir lock 16 is adapted to limit air from flowing from the primary reservoir portion 12a when the second airbrake reservoir lock 16 is in a locked position. The second airbrake reservoir lock 16 is additionally adapted to allow air to flow from the primary reservoir portion 12a to the air distribution block 26 when the second airbrake reservoir lock 16 is in an unlocked position.

The second output port 32 of the air reservoir 12 is disposed in fluid communication with a third airbrake reservoir lock 18. The second output port 32 is disposed in fluid communication with the secondary reservoir portion 12b. The third airbrake reservoir lock 18 is disposed in fluid communication with the distribution block 26 via a third hose 24. The third airbrake reservoir lock 18 is adapted to limit air from flowing from the secondary reservoir portion 12b when the third airbrake reservoir lock 18 is in a locked position. The third airbrake reservoir lock 18 is additionally adapted to allow air to flow from the secondary reservoir portion 12b to the air distribution block 26 when the third airbrake reservoir lock 18 is in an unlocked position.

The first, second, and third airbrake reservoir locks 14, 16, 18 are adapted to be in unlocked positions while the vehicle is running, allowing air to flow into and out of the air reservoir 12. When the vehicle is turned off, the airbrake reservoir locks 14, 16, 18 are adapted to switch to locked positions, limiting air flow out of the air reservoir 12. Turning off the vehicle may include shutting off the engine of the vehicle, or turning an ignition key of the vehicle to an off position or an accessory position. Limiting air flow out of the air reservoir 12 helps to retain air within the air reservoir 12, allowing a vehicle to be driven soon after restarting, as the air reservoir 12 will have sufficient quantity of air at an appropriate pressure to operate the brakes. Thus, an operator will not have to wait, or will not have to wait as long, for an air compressor to provide adequate air pressure to build within the airbrake system 10 so that the brakes may be released.

It is contemplated that the first, second, and third airbrake reservoir locks 14, 16, 18 are electronically controlled valves. Examples of electronically controlled valves that may be utilized as the reservoir locks 14, 16, 18 include electronically controlled ball valve assemblies, or electronically controlled diaphragm valve assemblies. Electronically controlled ball valves allow an entire volume of a port to be exposed when the ball valve is in an open position, making electronically controlled ball valves well suited for use as the airbrake reservoir locks 14, 16, 18. Electronically controlled valves typically have an electric motor adapted to open and close the valves. The airbrake reservoir locks 14, 16, 18 are in electronic communication with an electronic control module ("ECM") of the vehicle. The ECM generates an output signal to place the airbrake reservoir locks 14, 16, 18 in the unlocked position when the vehicle is running, and the ECM generates an output signal to place the airbrake reservoir locks 14, 16, 18 in the locked position when the vehicle is turned off.

While the embodiment shown in FIG. 1 has an integrated air reservoir 12, if separate air reservoirs are used for a primary reservoir and a second reservoir, an airbrake reservoir lock would be required on both an input and an output of both the primary reservoir and the secondary reservoir, necessitating a total of four airbrake reservoir locks.

While the airbrake system of FIG. 1 discloses a separate airbrake reservoir lock 16, 18 for the primary and secondary portions 12a, 12b, it is contemplated that a single airbrake reservoir lock 28 may be provided for both a primary air reservoir and a secondary air reservoir as shown in FIGS. 2-4. Such an airbrake reservoir lock 28 comprises a primary reservoir port 30 and a secondary reservoir port 32. The primary and secondary reservoir ports 30, 32 are disposed in fluid communication with a primary air reservoir and a secondary air reservoir respectively. The airbrake reservoir lock 28 has a first ball valve 34 and a second ball valve 36. The first ball valve 34 and the second ball valve 36 are connected to a ball valve armature 38 adapted to rotate both the first ball valve 34 and the second ball valve 36 between an open position and a closed position. The valve armature 38 is mechanically connected to a drive shaft 40 of the airbrake reservoir lock 28. The drive shaft 40 is adapted to be driven by an electrical actuator 42. The electrical actuator 42 is controlled by an ECM of the vehicle to provide a force to the drive shaft 40 and the valve armature 38 to place the first ball valve 34 and the second ball valve 36 in an open position or a closed position. The open position and the closed position correspond to an unlocked and a locked position, respectively, of the airbrake reservoir lock 28. The electrical actuator 42 is connected to a housing 44 of the airbrake reservoir lock 28 by fasteners (not shown) passing through mounting holes 46. Placing the primary reservoir port 30 and the secondary reservoir port 32 within the reservoir lock 28 reduces the number of reservoir locks 28 required in an airbrake system.

Turning now to FIGS. 5-6, another embodiment of a single airbrake reservoir lock 47 may be provided for both a primary air reservoir and a secondary air reservoir. Such an airbrake reservoir lock 47 comprises a primary reservoir port 48a and a secondary reservoir port 48b. The primary and secondary reservoir ports 48a, 48b are disposed in fluid communication with a primary air reservoir and a secondary air reservoir respectively. The airbrake reservoir lock 47 has a first indexing valve 50 and a second indexing valve 52. The first indexing valve 50 and the second indexing valve 52 are connected to an indexing valve armature 54 adapted to laterally move both the first indexing valve 50 and the second indexing valve 52 between an open position and a closed position. The valve armature 54 is mechanically connected to a drive shaft 56 of the airbrake reservoir lock 47. The drive shaft 56 is adapted to be driven by an electrical actuator 58. The electrical actuator 58 is controlled by an ECM of the vehicle to provide a force to the drive shaft 56 and the valve armature 54 to place the first indexing valve 50 and the second indexing valve 52 in an open position or a closed position. The open position and the closed position correspond to an unlocked and a locked position, respectively, of the airbrake reservoir lock 47. The electrical actuator 58 is connected to a housing 60 of the airbrake reservoir lock 44 by fasteners (not shown) passing through mounting holes 62.

Figure 7:
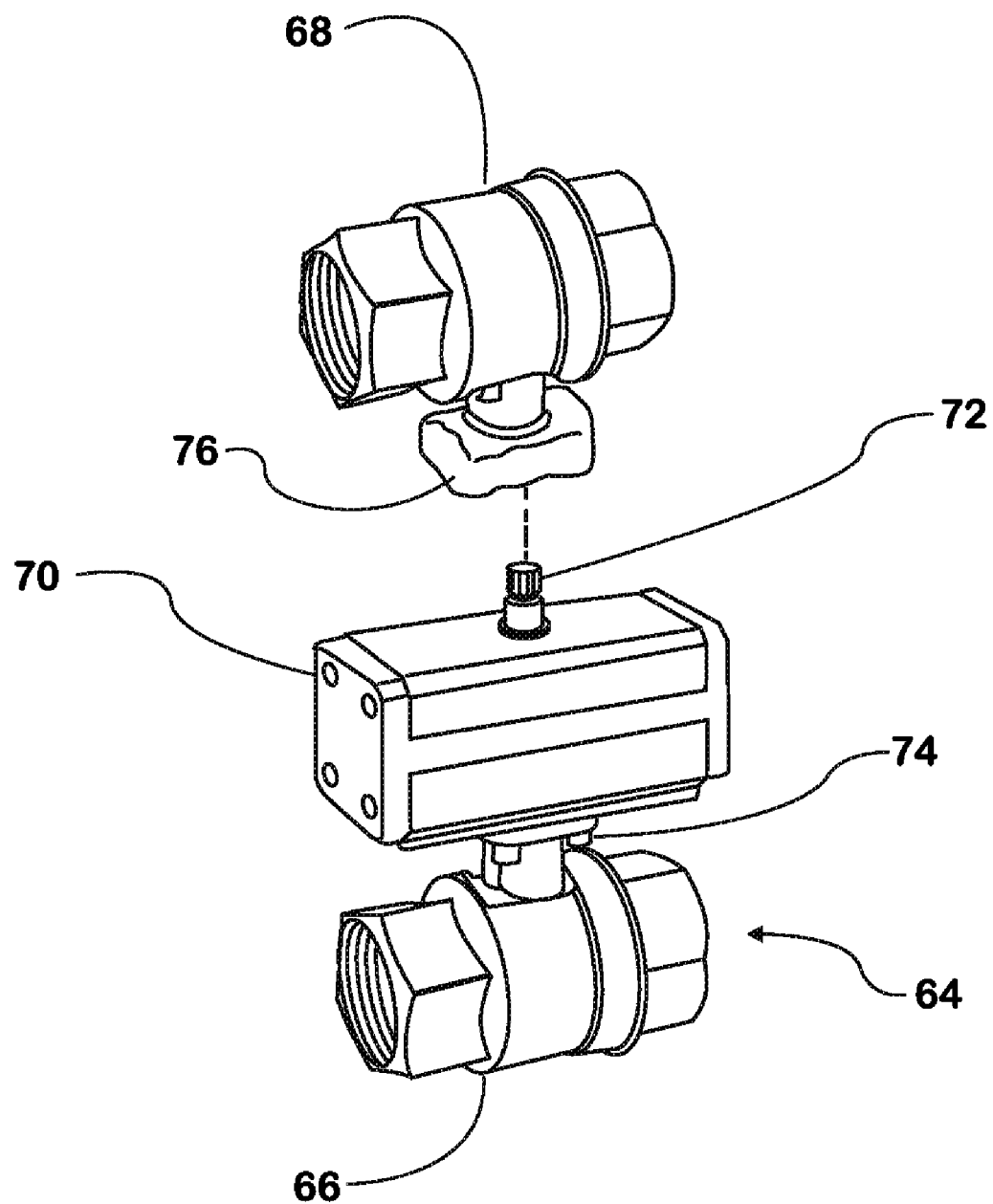
FIG. 7 is a perspective view of a valve for an airbrake reservoir lock according to a further embodiment.
Figure 8:
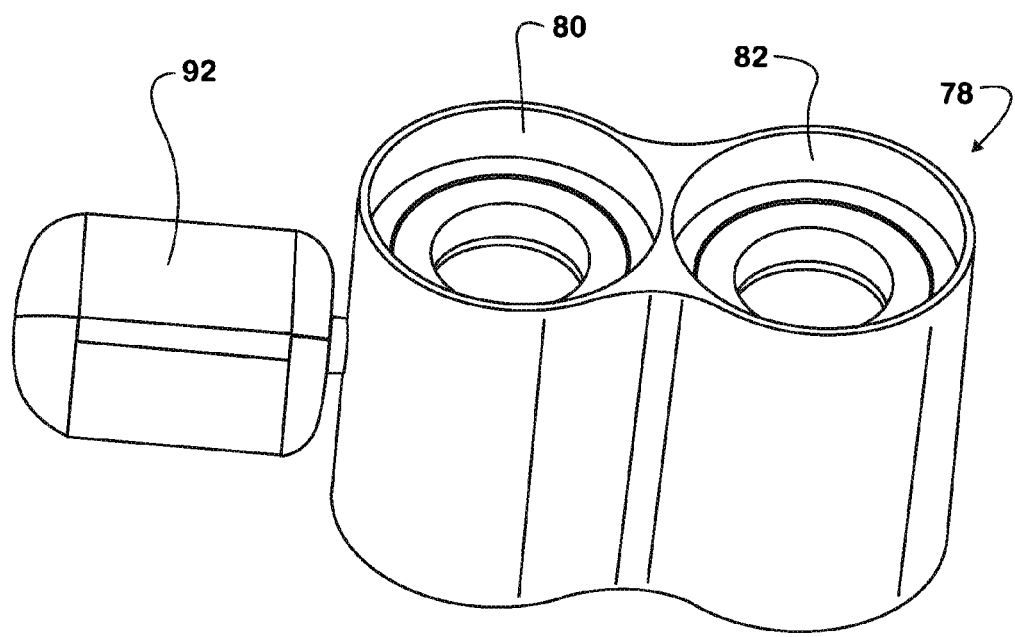
FIG. 8 is a perspective view of a valve for an airbrake reservoir lock according to yet another embodiment.

Turning now to FIG. 7, a further embodiment of a single airbrake reservoir lock 64 may be provided for both a primary air reservoir and a secondary air reservoir. Such an airbrake reservoir lock 64 comprises a primary reservoir lock 66 and a secondary reservoir lock 68. The primary and secondary reservoir locks 66, 68 are disposed in fluid communication with a primary air reservoir and a secondary air reservoir, respectively. The airbrake reservoir lock 64 has an electrical actuator 70. The actuator 70 has an output shaft 72 adapted to position the secondary reservoir lock 68 between an open position and a closed position. The actuator 70 additionally has a second output shaft (not shown) adapted to position the primary reservoir lock 66 between an open position and a closed position. The open position and the closed position correspond to an unlocked and a locked position, respectively, of the airbrake reservoir locks 66, 68. A mounting flange 74 of the primary reservoir lock 66 is provided to attach the primary reservoir lock 66 to the actuator 70. Similarly, a mounting flange 76 of the secondary reservoir lock 68 is provided to attach the secondary reservoir lock 68 to the actuator 70.

Turning now to FIGS. 8-11, yet another embodiment of an airbrake reservoir lock 78 is shown. The airbrake reservoir lock 78 comprises a primary reservoir port 80 and a secondary reservoir port 82. The primary and secondary reservoir ports 80, 82 are disposed in fluid communication with a primary air reservoir and a secondary air reservoir, respectively. The airbrake reservoir lock 78 has a first ball valve 84 and a second ball valve 86. The first ball valve 84 and the second ball valve 86 are connected to a ball valve armature 88 adapted to rotate both the first ball valve 84 and the second ball valve 86 between an open position and a closed position. The valve armature 88 is mechanically connected to both the first ball valve 84 and the second ball valve 86, such that rotation of one of the ball valves 84, 86 causes a complimentary rotation of the other one of the ball valves 84, 86. A drive shaft 90 of the airbrake reservoir lock 78 connects to the first ball valve 84. The drive shaft 90 is adapted to be driven by an electrical actuator 92. The electrical actuator 92 is controlled by an ECM of the vehicle to provide a force to the drive shaft 90, and the valve armature 88, to place the first ball valve 84 and the second ball valve 86 in an open position or a closed position. The open position and the closed position correspond to an unlocked and a locked position, respectively, of the airbrake reservoir lock 78. The electrical actuator 92 is connected to a housing 94 of the airbrake reservoir lock 78. Placing the primary reservoir port 80 and the secondary reservoir port 82 within the reservoir lock 78 reduces the number of airbrake reservoir locks 78 required in an airbrake system.

Figure 9:
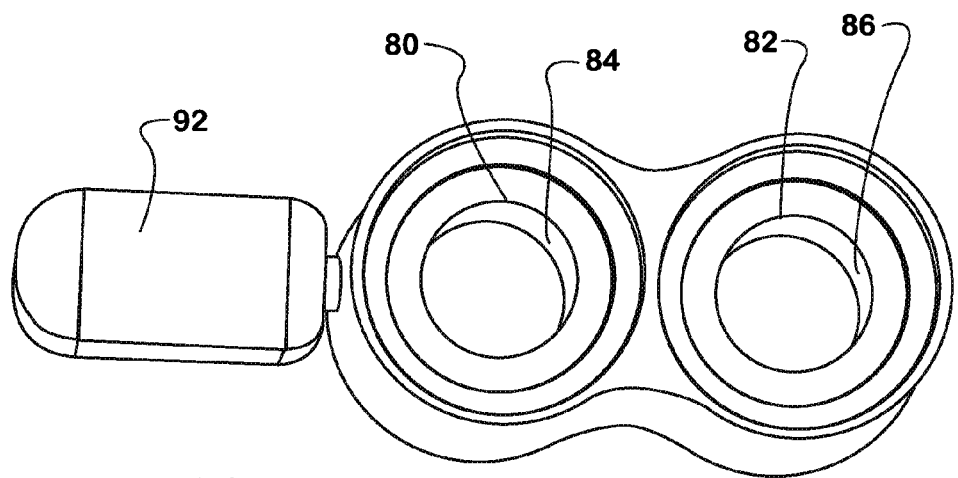
FIG. 9 is a bottom view of the valve of FIG. 8 in an open position.
Figure 10:
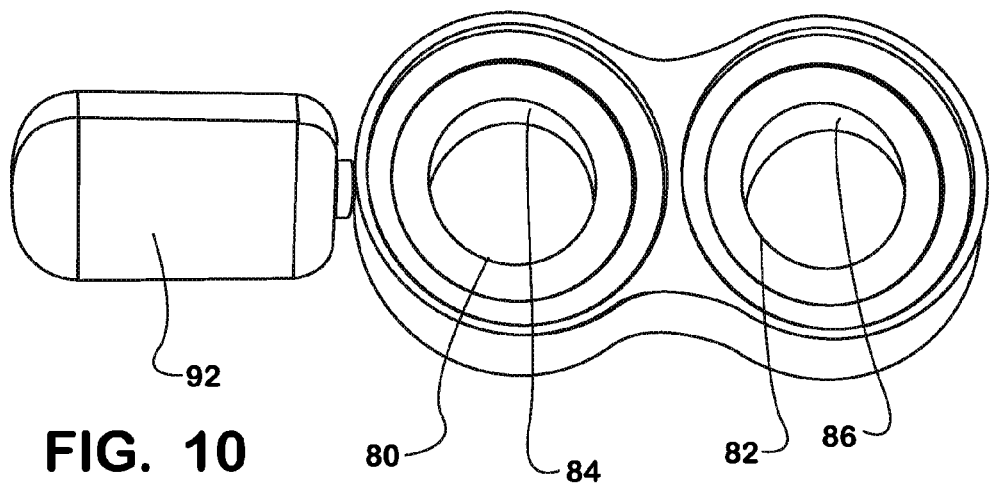
FIG. 10 is a bottom view of the valve of FIG. 8 in a partially closed position.
Figure 11:
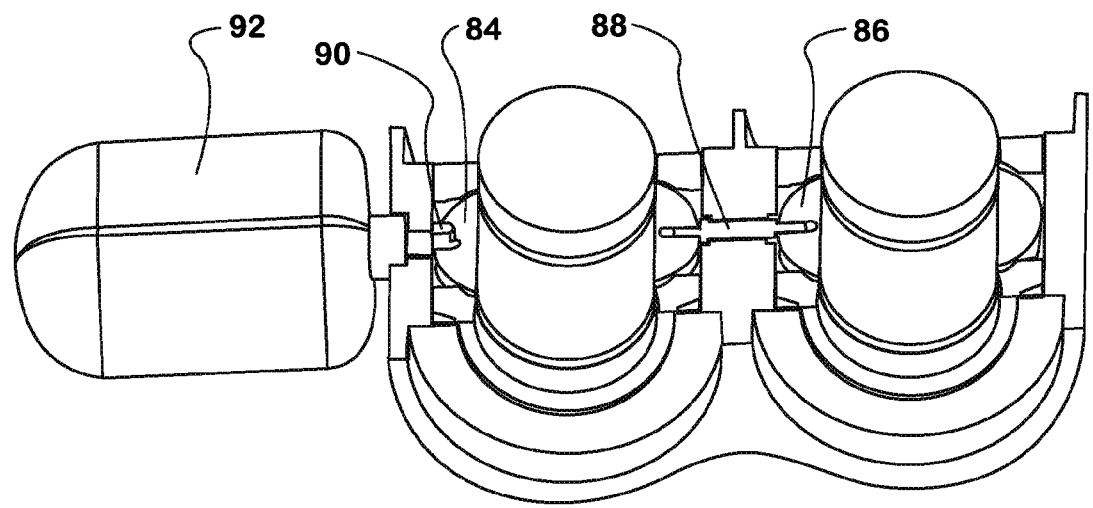
FIG. 11 is a cross sectional view of the valve of FIG. 8 taken along line 11-11 of FIG. 8.

As shown in FIG. 9, the first ball valve 84 and the second ball valve 86 are in an open position allowing the primary reservoir port 80 and the secondary reservoir port 82 to allow air to freely flow therethrough. FIG. 10 shows the first ball valve 84 and the second ball valve 86 in a partially closed position. As shown in FIG. 10, the first ball valve 84 partially blocks the primary reservoir port 80, while the second ball valve 86 partially blocks the secondary reservoir port 82. When the first ball valve 84 and the second ball valve 86 are in a fully closed position the primary reservoir port 80 and the secondary reservoir port 82 are fully blocked, restricting air from flowing through the airbrake reservoir lock 78.

What is claimed is:

1. An airbrake reservoir lock system for an airbrake system of a vehicle, the vehicle having an electronic control module, the airbrake reservoir lock system comprising:

a primary air reservoir having an input port and an output port, the primary air reservoir provided for storing pressurized air;

a first airbrake reservoir lock disposed in fluid communication with the output port of the primary air reservoir, the first airbrake reservoir lock having a valve portion and an electrical actuator, the electrical actuator being disposed in electrical communication with the electronic control module, the valve portion having an open position and a closed position, wherein the electrical actuator moves the valve portion of the first airbrake reservoir lock between the open position and a closed position in response to an output signal from the electronic control module; and a second airbrake reservoir lock disposed in fluid communication with the input port of the primary air reservoir, the second airbrake reservoir lock having a second valve portion and a second electrical actuator, the second electrical actuator being disposed in electrical communication with the electronic control module, the second valve portion having an open position and a closed position, wherein the second electrical actuator moves the second valve portion of the second airbrake reservoir lock between the open position and a closed position in response to an output signal from the electronic control module.

2. The airbrake reservoir lock system of claim 1 further comprising:

a secondary air reservoir having an input port and an output port, the secondary air reservoir provided for storing pressurized air; and a third airbrake reservoir lock disposed in fluid communication with the output port of the secondary air reservoir, the third electrical actuator being disposed in electrical communication with the electronic control module, the third airbrake reservoir lock having a third valve portion and a third electrical actuator, the third valve portion having an open position and a closed position, wherein the third electrical actuator moves the third valve portion of the third airbrake reservoir lock between the open position and a closed position in response to an output signal from the electronic control module.

3. The airbrake reservoir lock system of claim 2 further comprising:

a fourth airbrake reservoir lock disposed in fluid communication with the input port of the secondary air reservoir, the fourth airbrake reservoir lock having a fourth valve portion and a fourth electrical actuator, the fourth electrical actuator being disposed in electrical communication with the electronic control module, the fourth valve portion having an open position and a closed position, wherein the fourth electrical actuator moves the fourth valve portion of the fourth airbrake reservoir lock between the open position and a closed position in response to an output signal from the electronic control module.

4. The airbrake reservoir lock system of claim 1 further comprising:

a secondary air reservoir having an input port and an output port, the secondary air reservoir being provided for storing pressurized air; and a second airbrake reservoir lock disposed in fluid communication with the output port of the secondary air reservoir, the second airbrake reservoir lock having a second valve portion having an open position and a closed position, wherein the electrical actuator moves the second valve portion of the second airbrake reservoir lock between the open position and a closed position in response to an output signal from the electronic control module.

5. The airbrake reservoir lock system of claim 4 further comprising:

a third airbrake reservoir lock disposed in fluid communication with the input port of the primary air reservoir, the third airbrake reservoir lock having a third valve portion and a second electrical actuator, the second electrical actuator being disposed in electrical communication with the electronic control module, the third valve portion having an open position and a closed position, wherein the second electrical actuator moves the second valve portion of the second airbrake reservoir lock between the open position and a closed position in response to an output signal of the electronic control module.

6. The airbrake reservoir lock system of claim 5 further comprising:

a fourth airbrake reservoir lock disposed in fluid communication with the input port of the secondary air reservoir, the fourth airbrake reservoir lock having a fourth valve portion having an open position and a closed position, wherein the second electrical actuator moves the fourth valve portion of the fourth airbrake reservoir lock between the open position and a closed position in response to an output signal of the electronic control module.

7. The airbrake reservoir lock system of claim 1, wherein the first airbrake reservoir lock valve portion is a ball valve.

8. The airbrake reservoir lock system of claim 1, wherein the output signal from the electronic control module moves the first airbrake reservoir lock to the closed position when the vehicle is turned off.

9. The airbrake reservoir lock system of claim 1, wherein the output signal of the electronic control module moves the first airbrake reservoir lock to the open position when the vehicle is operating.

10. A method of limiting air flow from an airbrake reservoir of a vehicle having an airbrake system, and an electronic control module, the airbrake system having at least an airbrake reservoir and at least one airbrake reservoir lock in fluid communication, the method comprising:

providing an airbrake reservoir lock in fluid communication with an airbrake reservoir;

receiving a first output signal from the electronic control module actuating the airbrake reservoir lock to a locked position in response to the first output signal; and receiving a second output signal from the electronic control module actuating the airbrake reservoir lock to an unlocked position in response to the second output signal, wherein the airbrake reservoir lock restricts air flow through the airbrake reservoir lock when the airbrake reservoir lock is in the locked position, and wherein the airbrake reservoir lock allows air flow through the airbrake reservoir lock when the airbrake reservoir lock is in the unlocked position.

11. The method of claim 10, wherein the first output signal is generated when the vehicle is turned off.

12. The method of claim 10, wherein the second output signal is generated when the vehicle is turned on.

13. The method of claim 10, wherein the airbrake reservoir lock prevents air flow through the airbrake reservoir lock when the airbrake reservoir lock is in a locked position.

14. The method of claim 10, wherein locking the airbrake reservoir lock rotates a ball valve in a first direction within the airbrake reservoir lock.

15. The method of claim 14, wherein unlocking the airbrake reservoir lock rotates a ball valve in a second direction within the airbrake reservoir lock.

16. An airbrake reservoir lock system for an airbrake system of a vehicle, the vehicle having an electronic control module, the airbrake reservoir lock system comprising:

an air reservoir having a primary portion, a secondary portion, and an input port, the primary portion having a primary portion output port, and the secondary portion having a secondary portion output port, the air reservoir provided for storing pressurized air;

a first airbrake reservoir lock disposed in fluid communication with the output port of the primary portion of the air reservoir, the first airbrake reservoir lock having a valve portion and an electrical actuator, the electrical actuator being disposed in electrical communication with the electronic control module, the valve portion having an open position and a closed position; and a second airbrake reservoir lock disposed in fluid communication with the output port of the secondary portion of the air reservoir, the second airbrake reservoir lock having a second valve portion and a second electrical actuator, the second electrical actuator being disposed in electrical communication with the electronic control module, the second valve portion having an open position and a closed position, wherein the electrical actuator moves the valve portion of the first airbrake reservoir lock between the open position and a closed position in response to an output signal from the electronic control module, and wherein the second electrical actuator moves the second valve portion of the second airbrake reservoir lock between the open position and a closed position in response to an output signal from the electronic control module.

17. The airbrake reservoir lock system of claim 16 further comprising a third airbrake reservoir lock disposed in fluid communication with the input port of the air reservoir, the third airbrake reservoir lock having a third valve portion and a third electrical actuator, the third electrical actuator being disposed in electrical communication with the electronic control module, the third valve portion having an open position and a closed position, wherein the third electrical actuator moves the third valve portion of the third airbrake reservoir lock between the open position and the closed position in response to an output signal of the electronic control module.

18. The airbrake reservoir lock system of claim 16, wherein the first airbrake reservoir lock valve portion and the second airbrake reservoir portion lock valve portion are ball valves.

19. The airbrake reservoir lock system of claim 16, wherein the output signal of the electronic control module moves the first airbrake reservoir lock and the second airbrake reservoir lock to the closed position when the vehicle is turned off.

* * * * *